UNITED STATES PATENT OFFICE.

OTTO TROEMEL, OF MANITOWOC, WISCONSIN.

IMPROVED MEDICINE FOR WOUNDS, INFLAMMATION, &c.

Specification forming part of Letters Patent No. 41,873, dated March 8, 1864.

*To all whom it may concern:*

Be it known that I, OTTO TROEMEL, of Manitowoc, in the county of Manitowoc, State of Wisconsin, have invented a new medicine which will effectually and successfully heal flesh-wounds of every description, prevent and remove inflammation, and cure fever and other diseases, of which the following is a specification.

This medicine is composed of green vitriol, alum, verdigris, and sal-ammonia, in the following proportions, to wit: three-quarters of a pound of green vitriol, half a pound of alum, half an ounce of verdigris, and one-quarter of an ounce of sal-ammonia. These named ingredients, after being well ground and mixed, have to be completely melted, and when done so and cooled off a solid and stone-like mass is the product of such melting process, and is also the medicine which prevents and removes inflammations, heals flesh-wounds, &c., as stated above. To produce such an effect this solid mass must be decomposed in soft water, mixing one-half an ounce of the mass with one and one-half quart of soft water, and keeping it in a well-corked bottle and in moderated temperature, and then applying to the wounded or inflamed limbs a cataplasm of the so produced water, or, in case of fever, a cataplasm to the forehead, and keeping it damp till fever ceases or inflammation has been removed and the wound healed up. Such cataplasm simply may consist of a piece of cloth wetted with the described water and kept damp, as heretofore said.

What I claim as my invention, and desire to secure by Letters Patent, is—

The production of the above-described solid and stone-like mass by the mixture and melting of the above-named ingredients, substantially as and for the purpose set forth.

OTTO TROEMEL.

Witnesses:
   A. BERNER,
   H. BERNER.